United States Patent
Holmes

(10) Patent No.: US 10,140,590 B2
(45) Date of Patent: Nov. 27, 2018

(54) DATA APPROVAL SYSTEM AND METHOD

(75) Inventor: Christopher Neil Holmes, County Durham (GB)

(73) Assignee: Oracle International Corporation, Redwood Shores, CA (US)

(*) Notice: Subject to any disclaimer, the term of this patent is extended or adjusted under 35 U.S.C. 154(b) by 1175 days.

(21) Appl. No.: 12/172,982

(22) Filed: Jul. 14, 2008

(65) Prior Publication Data

US 2010/0011001 A1    Jan. 14, 2010

(51) Int. Cl.
*G06Q 10/00* (2012.01)
*G06Q 10/10* (2012.01)

(52) U.S. Cl.
CPC .................... *G06Q 10/10* (2013.01)

(58) Field of Classification Search
USPC ................... 705/1.1, 301–300, 348
See application file for complete search history.

(56) References Cited

U.S. PATENT DOCUMENTS

| | | | |
|---|---|---|---|
| 7,131,071 B2* | 10/2006 | Gune | G06Q 10/0631 715/769 |
| 2002/0091586 A1 | 7/2002 | Wakai et al. | |
| 2003/0110114 A1* | 6/2003 | Dmochowski et al. | 705/36 |
| 2004/0153354 A1* | 8/2004 | Nonaka et al. | 705/8 |
| 2006/0143324 A1* | 6/2006 | Awamoto et al. | 710/14 |
| 2006/0173698 A1 | 8/2006 | Morley | |
| 2006/0242132 A1* | 10/2006 | Smith | 707/3 |
| 2007/0179790 A1 | 8/2007 | Leitch et al. | |
| 2007/0179926 A1* | 8/2007 | Chiang | 707/1 |
| 2007/0220068 A1* | 9/2007 | Thompson et al. | 707/203 |
| 2009/0319535 A1* | 12/2009 | Webber | G06F 17/3056 |

FOREIGN PATENT DOCUMENTS

JP    2005038145 A    10/2005

OTHER PUBLICATIONS

Web page; Geary, "Strategy for Success; Thee Powerful Strategy Design Pattern Aids Object-Oriented Design," www.JavaWorld.com, Apr. 26, 2002, at http://www.javaworld.com/javaworld/jw-04-2002/jw-0426-designpatterns.html, printed Jul. 11, 2008, 12 pages.

(Continued)

*Primary Examiner* — Tiphany B Dickerson
(74) *Attorney, Agent, or Firm* — Fish IP Law, LLP

(57) ABSTRACT

A data approval system is provided. The system comprises a transaction model comprising program code for implementing one or more computer-implemented methods for use in an approval process, the approval process comprising an approval operation; a plurality of differentiated data-handling modules adapted to provide different methods for managing data during the approval process, wherein each module comprises program code for implementing one or more computer-implemented methods; and a storage device for storing configuration parameters that are configurable for a particular approval process; wherein the data approval system is adapted to select one or more data-handling modules from the plurality of modules to manage data during the approval process based on the configuration parameters.

11 Claims, 5 Drawing Sheets

(56) References Cited

OTHER PUBLICATIONS

Web page; "VYAS, A Much Better Strategy Pattern," Programming Thoughts @ Work, at http://anirudhvyas.com/root/2008/04/02/a-much-better-strategy-pattern/, printed Jul. 11, 2008, 6 pages.
Web page; "Strategy Pattern," Wikipedia, the free encyclopedia, at http://en.wikipedia.org/wiki/Strategy_pattern, printed Jul. 11, 2008, 7 pages.
Web page; "The 'Gang of Four' Companion: Strategy Design Pattern," LePUS3 and Class-Z, at http://www.lepus.org.uk/ref/companion/Strategy.xml, printed Jul. 11, 2008, 3 pages.
Web page; "The Strategy Pattern," Net Objectives Repository, at http://www.netobjectivesrepository.com/TheStrategyPattern, printed Jul. 11, 2008, 6 pages.
Search Report for Application No. GB0907503.7 dated Aug. 6, 2009; 6 pages.

\* cited by examiner

DATA APPROVAL SYSTEM AND METHOD

BACKGROUND OF THE INVENTION

Field of the Invention

The present invention is in the field of data management systems. In particular, the present invention provides a system and a method for managing data during the approval of a transaction. The present invention may be used to modify data in a database after an approval operation.

Description of the Related Art

Data approval systems are used to control the flow of information within an organisation. Due to the allocation of roles and responsibilities within a typical organisation, a decision or "transaction" may need to be presented to an appropriate employee for approval before any alteration is made to the organisation's records or systems.

A decision or "transaction" will typically comprise an implicit or explicit request to modify stored data. For example, in a relatively large company, promotions or pay rises will typically need to be approved by a senior manager and/or a member of a human resources (HR) department. In this circumstance, the "transaction" comprises an explicit request for a promotion or pay raise and an implicit request for modification to company records if the request is approved. The "approval operation" in such an example may be seen as the activity by the manager or HR member that approves or declines the request. If the promotion or pay rise is approved then changes may need to be made to the data comprising employee records, financial records, security permissions, and/or marketing data. Typically, the data to be updated following an approval operation resides in a database. Other examples of possible "transactions" that can be implemented in a data approval system include enrollment in an academic institution, rental of a motor vehicle and the loan of a media item.

In the art, during the design and development of a particular data approval system, it has typically been the responsibility of the developers of the system to choose a particular data management method to manage data during the approval process. This data management method may provide functionality such as handling data before and after a request for approval and integration of approved data into a database. The developers may choose a particular data management method based on their personal preference or the relevance of the method to the approval process in hand. The choice of method is commonly made at an early point in the development of the system and once a choice has been made then the data approval system will be developed in hardware and/or software based on the design patterns for the chosen method. This has meant that data approval systems for different approval processes, for example promotion management versus media rental, have been designed and developed separately as individual bespoke solutions. This then results in a lack of flexibility and a high level of duplication during system development.

Hence, there is a requirement in the art for a flexible approval system that can be efficiently produced with a minimal duplication of effort.

BRIEF SUMMARY OF THE INVENTION

In accordance with a first aspect of the present invention, a data approval system comprises: a transaction model comprising program code for implementing one or more computer-implemented methods for use in an approval process, the approval process comprising an approval operation; a plurality of differentiated data-handling modules adapted to provide different methods for managing data during the approval process, wherein each module comprises program code for implementing one or more computer-implemented methods; and a storage device for storing configuration parameters that are configurable for a particular approval process; wherein the data approval system is adapted to select one or more data-handling modules from the plurality of modules to manage data during the approval process based on the configuration parameters.

Such a system allows methods that are common to multiple approval processes to be provided by a transaction model. It also enables the data handling method used in a particular approval process to be set using the configuration parameters. In this case, a "transaction" may be seen as an operation during an approval process, for example a request for approval of a change in data; a "transaction model" may be seen as the hardware and/or software components that implement a "transaction", for example, one or more Java classes; an "approval process" may be seen as the context in which the request for approval is made, for example, a media or car rental process; and an "approval operation" may be seen as the operation in which a user approves or declines a request.

Using the present invention, the management of a request for approval may be provided by generic methods forming part of the transaction model whilst the storage of data associated with the request may be managed using a particular data storage or integration method chosen from a group of possible storage or integration methods. The particular integration or storage method chosen for a particular approval process may be changed by altering the configurable parameters. This means that a generic transaction model or framework can be used for all approval processes whilst allowing developers to use different data handling methods for each approval process based on, for example, personal preference or the particulars of the approval process.

Preferably each data handling module is adapted to provide one or more of the following functions: handling data to be approved before the approval operation; handling approved data after the approval operation; handling unapproved data after the approval operation; and integrating approved data into a database after the approval operation.

Hence, the data handling method provided by the differentiated data handling modules provide methods for handling data at multiple points in the approval process. A common data handling module may be provided for all of the functions described above or different methods provided by different data handling modules may be chosen for each of the functions.

Preferably, the different methods provided by the plurality of data handling modules comprise two or more from: computer-implemented methods for handling data to be approved using a cache independent of a database, wherein approved data is integrated from the cache into the database after the approval operation; computer-implemented methods for handling data to be approved using a database, wherein data to be approved is represented using a status column; and computer-implemented methods for handling data to be approved using a copy of a table in a database, wherein the copy of the table is integrated with the original table if data is approved after the approval operation. Each computer-implemented method may be adapted to interact with a common database.

Hence, known or future developed methods for handling data may be provided and may be used by the data approval system in a plug-and-play manner to provide a coherent modular solution.

In certain embodiments, the configuration parameters comprise a table with at least two columns, a first column storing the name of a method used by the transaction model; and a second column storing reference data relating to one of the plurality of data-handling modules; each row in the table representing a different method that is used by the transaction model, the reference data for each row being configurable for a particular approval process.

Hence the data approval system or transaction model may call a method referenced by a string stored in the first column of a row of the table, and then may use the table to look up corresponding reference data, for example a class name or string representing a class, to implement the one of the plurality of data handling modules that has been selected for the particular approval process. If a developer wishes to use a different data handling method, then the data in the second column may be changed to refer to the different data handling method, for example a different Java class.

Preferably the table comprises a Java hash table and/or the plurality of data handling modules comprise a plurality of Java classes. However, in other embodiments the plurality of data-handling modules may comprise objects in an alternate object-oriented language, such as C++, Ruby or Python. Using an object oriented programming language to provide the modular functionality of the plurality of data handling modules, an efficient modular solution can be provided in a "plug-and-play" manner. In other embodiments, it is also possible to implement the present invention using standard procedural programming languages.

Preferably, the transaction model is used for a plurality of approval processes and/or each approval process has an associated configuration parameter table. However, in other embodiments one or more configuration parameter tables may be provided for a plurality of approval processes.

Preferably, each of the plurality of data handling modules produces a common modification to a database. For example, each of the methods for handling data discussed above may result in an identical database configuration after an approval operation. In this case, the plurality of data handling modules vary in the method used to achieve this final common configuration. The database may be used to store data that is updated after an approval operation, for example, if a request for a change in data in the database is approved.

In accordance with a second aspect of the present invention, a method of managing data in an approval process is provided wherein the method comprises: presenting data for approval using computer-implemented methods provided in a transaction model; approving data using computer-implemented methods provided in the transaction model; and selecting one of a plurality of data handling methods to manage the data during the approval process based on configuration parameters associated with the present approval process, wherein each data handling method provides a different method of managing data.

Such a method provides similar advantages to the first aspect of the present invention. The selection of one of a plurality of data handling modules may occur at any point during the method; for example, to provide one or more of handling data to be approved before an approval operation; handling approved data after the approval operation; handling unapproved data after the approval operation; and integrating approved data into a database after the approval operation.

In certain embodiments, the plurality of data handling methods comprise two or more of computer-implemented methods for handling data to be approved using a cache independent of a database, wherein approved data is integrated from the cache into the database after an approval operation; computer-implemented methods for handling data to be approved using a database, wherein data to be approved is represented using a status column in the database; and computer-implemented methods for handling data to be approved using a copy of a table in a database, wherein the copy of the table is integrated with the original table if data is approved after an approval operation.

There may be a one-to-one mapping between data handling methods and data handling modules or a particular data handling module may provide one or more data handling methods. For example, a single module may provide the cache functionality described above or a family of modules may provide different aspects of the cache functionality, for example at different points in the approval process. Alternatively, a data handling module may provide a particular subset of operations in a chosen data handling method, for example a single module implementing the cache functionality may call upon sub-modules to implement specific features of this functionality.

Preferably, the step of selecting one of a plurality of data handling methods comprises: calling a method name from one or more computer-implemented methods provided in the transaction model; mapping the method name to a reference identifying a particular data handling method using the configuration parameters; and implementing the data handling method identified by the reference.

The step of calling a method name may comprise referencing and implementing a particular function from a list of functions. The mapping provided by the method thus maps this reference method name to one of the particular data handling methods, wherein the method name may be an abstracted word or phrase describing a data handling process that may be performed in one or more different ways by each of the data handling methods. The implementation of the data handling method may comprise implementing a class in an object orientated language, the processing, by a processor, of one or more lines of program code stored in a memory, or the activation of a particular component in one or more of hardware and/or software.

Preferably the step of mapping is implemented using a Java hash table wherein the step of selecting one of a plurality of data handling methods may additionally comprise selecting a Java class from a plurality of Java classes. Again, as specified with the first aspect, any object oriented language may be used to provide the data handling methods, or alternatively a suitably adapted procedural language may also be used.

Preferably each of the plurality of data handling methods results in a common modification to a database after an approval operation.

According to a third aspect of the present invention, a computer readable medium is provided comprising a program code configured to implement any of the method steps discussed above.

According to a fourth aspect of the present invention, a data table is provided comprising at least two columns, a first column for storing a reference to a method used during a data approval process; and a second column for storing a reference to one of a plurality of data-handling modules, the plurality of data handling modules being adapted to provide different data handling methods to produce a common update to a database after an approval operation; wherein each row in the table represents a mapping for a particular method that is used during the data approval process, the reference to one of a plurality of data-handling modules for each row being configurable for the particular approval process.

Such a data table may comprise a Java-hash table and/or the reference to one of a plurality of data handling modules may comprise a Java class name. Hence, such a data table may enable a modular data approval process, wherein particular data handling methods can be modularly "slotted" into the approval process based on configuration data stored in the data table. The contents of the data table may then be changed to implement different data handling methods.

BRIEF DESCRIPTION OF THE DRAWINGS

Embodiments of the present invention will now be described and contrasted with known examples with reference to the accompanying drawings, in which.

DETAILED DESCRIPTION OF THE INVENTION

Figure 1:
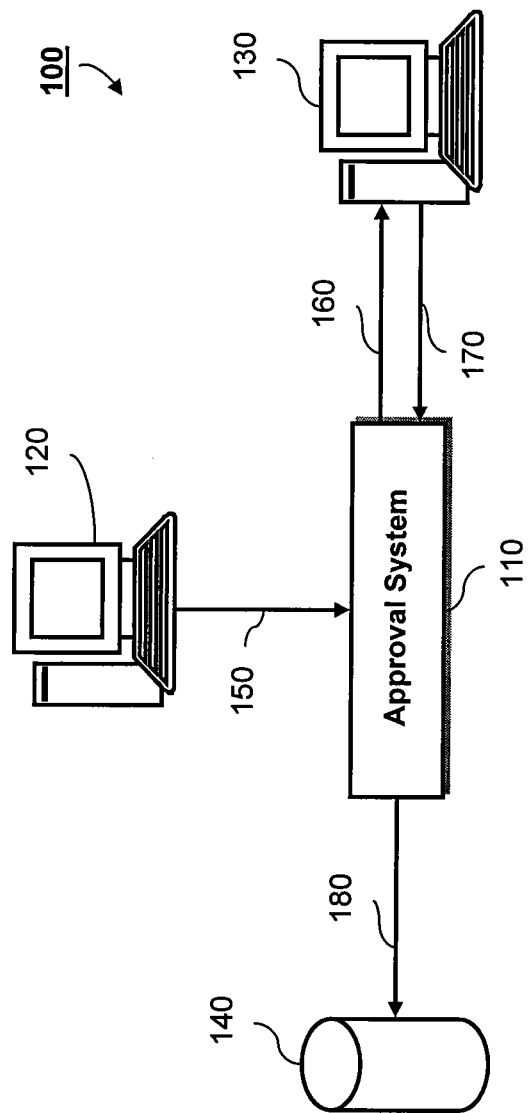
FIG. 1 illustrates schematically the components that may interact with an exemplary data approval system, such as the system provided by the present invention.

FIG. 1 shows a number of technical components that may be used with a data approval system implemented according to the present invention. The components of FIG. 1 are described below with relation to one embodiment of the present invention; however, it must be noted that, in other embodiments, the data approval system of the present system may interact with other components instead of, or as well as, those shown in FIG. 1.

Data approval system 110 is adapted to receive a request 150 for approval from a client device 120. Request 150 typically comprises a request for one or more changes in data stored in a database 140. In certain embodiments, the request 150 for approval may be made from a data entry session. For example, a web page or a forms-based application may be presented to the user of client device 120, wherein the user is able to manipulate the web page or application to enter, and submit, data changes. In other embodiments, the request 150 may be made within the bounds of a remote call, i.e. within the bounds of a reference to a function that is to be implemented independently of an active application on client device 120. For example, a call (i.e. a request that a referenced function is implemented on a processor) may be made by an application running upon client device 120 to a Service-Oriented Architecture (SOA) service provided by Approval System 110. When the call is made, parameters representing the required data changes may be passed to the called service. In a similar manner, the user of client device 120 may alternatively access a remote service provided by an instance of an application implemented by a remote server; this remote server may then make a service call to a separate service provided by a separate remote server as part of the Approval System 110. In this way the present invention may be implemented by any number of networked devices.

The request 150 for approval is typically communicated to the data approval system 110 over a network infrastructure, for example, a local or wide area network. After initial receipt and processing of the request 150 by the approval system 110, a further communication 160 comprising the details of the request 150 is communicated by the data approval system 110 to an appropriate party for an approval operation.

In the present case, an approval operation comprises obtaining data from an appropriate user of a second client device 130, wherein the user has permission to approve or decline the request for a change in data in database 140. For example, communication 160 may be forwarded to client device 130 as an electronic message or "email" containing a link to a HTML (HyperText Markup Language) or XML (eXtended Markup Language) page. Such a page may be rendered by a browser operating upon client device 130 to provide user interface controls to the user of client device 130. The user of client device 130 may then use these controls to indicate whether the request is approved or declined; in a simple example, this could be a "Yes/No" radio button control together with a "submit" button control. As well as providing the answer to a simple "approve or decline" decision, the user of client device 130 may also provide further details specifying the form and/or content of the change in data. The approval operation may then be completed by activating a suitable control, such as the "submit" button described above. In other embodiments of the present invention the approval operation may be completed using one or more other methods, including, but not limited to, providing the request and approval result via short messaging service (SMS) messages or other mobile device protocols; and interacting with client software on client device 130 that is adapted to send the approval result to approval system 110 using proprietary methods and standard wired or wireless network protocols, wherein the client software may be a stand-alone application or implemented as part of an application suite.

After the approval operation is complete, the results 170 of the operation are communicated to the data approval system 110. On receipt of the results 170, the approval system 110 determines whether the original request 150 has been approved or declined so that, if necessary, the required changes may be made to database 140. If the request has been approved then approval system 110 is adapted to update the database 140, as shown by arrow 180, to implement the required changes. If the results 170 returned from the client device 130 indicate that the request has been declined, then the approval system 110 is adapted to manage any temporary data that was generated during the approval process and, if necessary, end the approval process. In some embodiments, the data approval system 110 may also be further adapted to notify the outcome of the approval process to one or more involved parties, e.g. the user of client device 120 or client device 130.

Figure 2:
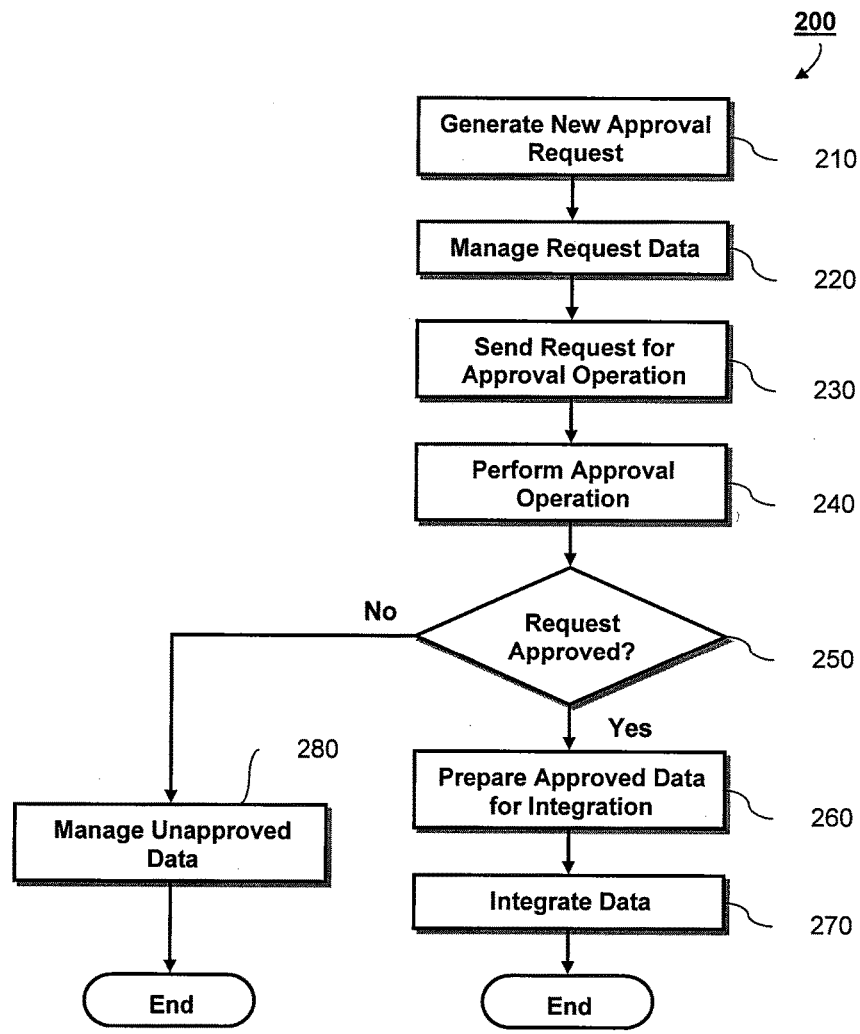
FIG. 2 shows a method of approving data using the exemplary data approval system shown in FIG. 1.

FIG. 2 shows the steps involved in an exemplary approval process 200. The method begins at step 210 wherein a new approval request is generated. This request may be generated by a user of client device 120 and sent to the data approval system 110 as described above. At step 220 the data approval system 110 manages any data associated with the request for approval. This may involve formatting a request received from client device 120 for onward communication to an appropriate party and/or client device. Additionally or alternately, based on the received request, this step may involve preparing data to be added, edited and/or removed from database 140 if the request is to be approved. At step 230 the formatted request is communicated to the appropriate party or device for an approval operation, for example, as communication 160. At step 240 the appropriate party or device completes the approval operation and generates a set of results 170 indicating whether the request has been approved or declined, for example, referring to FIG. 1 this may be performed by a user of client device 130. At step 250, the results 170 are analysed to determine whether the request has been approved or declined. If the request has been approved then the data to be added, edited and/or deleted from database 140 is prepared by the approval system 110 at step 260 and then at step 270 such data is integrated into the database 140, as shown by arrow 180 in FIG. 1. If the request is declined, then any temporary data created by the approval system 110 or the client device 120 as part of the request for approval is managed at step 280. This may involve deleting any pending data and/or rolling back any changes that were made to database 140. After either of steps 270 or 280 the approval process then ends.

Figure 3:
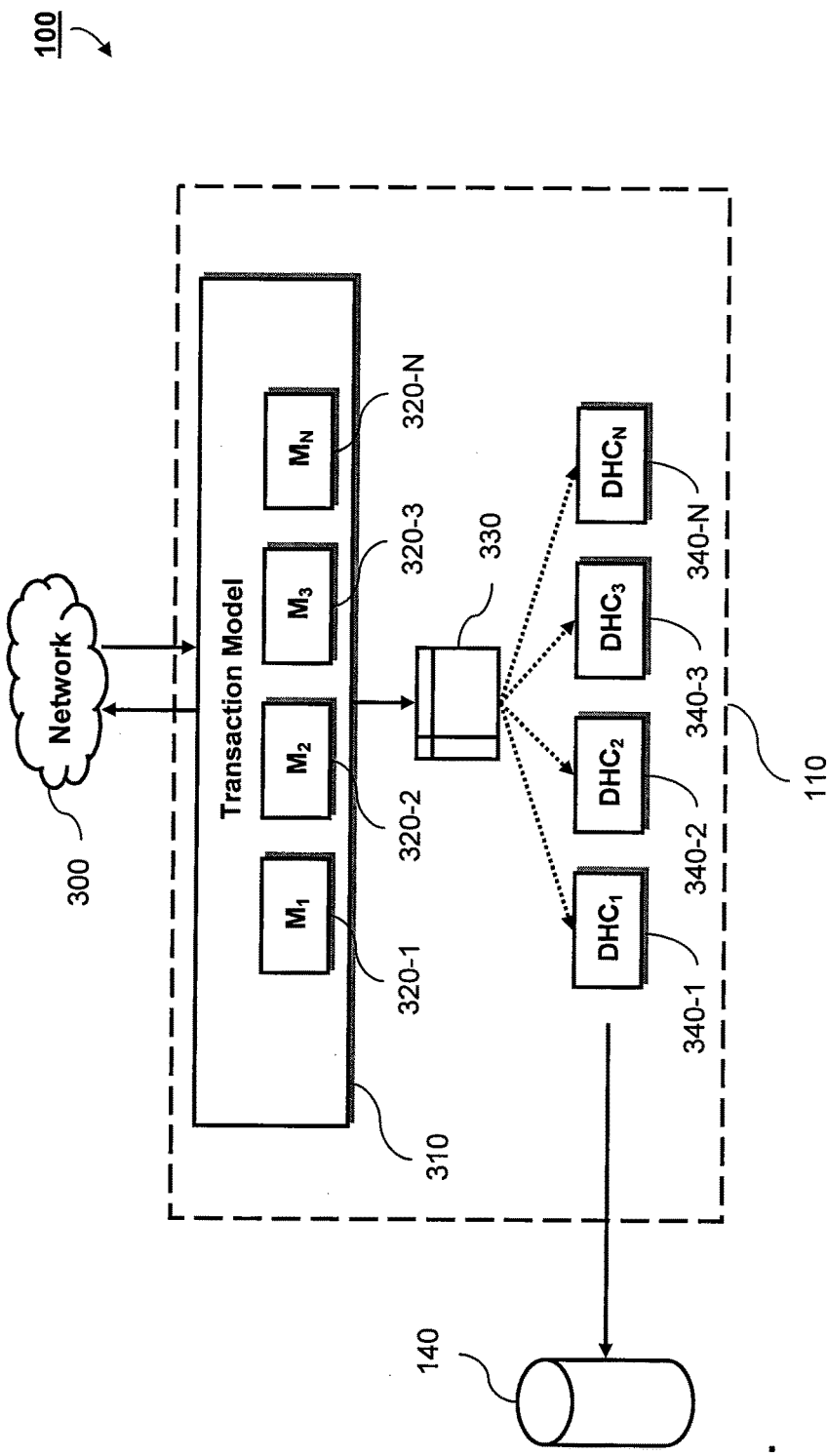
FIG. 3 illustrates schematically the components of an exemplary data approval system according to the present invention.

FIG. 3 shows in more detail the exemplary data approval system 110 as shown in FIG. 1. The data approval system 110 shown in FIG. 3 comprises a transaction model 310. Transaction model 310 comprises one or more modules 320 that provide methods for implementing the approval system. For example, the data approval system 110 may be implemented by a server comprising a processor and memory, wherein computer program code is loaded from memory and processed by the processor to provide the functionality of the data approval system 110. The transaction model 310 may be connected to a network 300. Network 300 allows communications to be sent to, and received from, client devices 120 and 130. Network 300 may be any known local area or wide area network or may be replaced with wired communication links for direct communication.

In the present example, modules 320 comprise software objects in an object oriented language, for example Java class files stored in memory. When such class files are implemented by the processor, they may be used to implement any of steps 210 to 250 in the approval process of FIG. 2. In other embodiments, these modules may be adapted to provide functionality not shown in FIG. 2 and/or may comprise object-oriented or procedure functions in any known programming language.

For example: module M1 (320-1) may comprise computer program code stored in memory, or on a storage device, that, when implemented, provides methods for presenting appropriate data to a user of client device 120 in order for them to compose a request for approval; module M2 (320-2) may comprise computer program code adapted to receive a request 150 for approval over the network 300; module M3 (320-3) may comprise computer program code adapted to send a formatted request 170 for approval to the user or client device 130; and additional modules MN (320-N) may comprise program code adapted to receive the results 180 of an approval operation. The number of modules, N, depends on the complexity of the data approval system and the required functionality. However, the transaction model 310 and its component modules 320 are designed to provide generic methods for an approval process, i.e. methods that can be used for different approval processes to avoid duplication of effort. The transaction module 310 and its component modules 320 also enable a consistent set of approval methods and standardisation of procedure across multiple approval processes. For example, the same methods may be used to request the approval of a promotion as may be used to request the approval of a media rental. In the present example, the term "transaction" refers to discrete processes that form part of the approval process, for example, a "transaction" may equate to a data exchange between users or devices.

The exemplary data approval system 110 of FIG. 3 also comprises a plurality of data handling classes 340 that are adapted to provide data handling methods to manage data throughout the approval process. For example the plurality of data handling classes may comprise computer program code adapted to provide one or more of: algorithms or routines for handling data forming part of the approval request; algorithms or routines for handling integration of approved data into database 140; and algorithms or routines for handling data following a declined request for approval. In a preferred embodiment, the classes comprise one or more Java classes; however, other procedural or object-oriented languages may be used as required. Additionally, in certain embodiments a group of heterogeneous modules implemented in different programming languages may be used.

Within the plurality of data handling classes 340 there may be two or more classes that provide a common high-level data handling function, for example, handling integration of data into database 140, but provide this function, at a lower level, in different ways using different low-level methods. For example, when handling integration of data into database 140, a first data handling class DHC1 (340-1) may comprise computer program code adapted to provide methods that use a cache to store data associated with an approval request, e.g. data to be added, edited or deleted in database 140; data handling class DHC2 (340-2) may comprise computer program code adapted to provide methods that utilize a status column in database 140; data handling class DHC3 (340-3) may comprise computer program code adapted to provide methods that use a copy of a table in database 140 (a "shadow" table) to handle data during the approval process; and data handling class DHCN (340-N) may comprise computer program code adapted to further alternative methods. Each of these data handling classes 340-1 to 340-N may provide the same final alteration to database 140. This will now be described in more detail with relation to FIG. 5.

Figure 5:
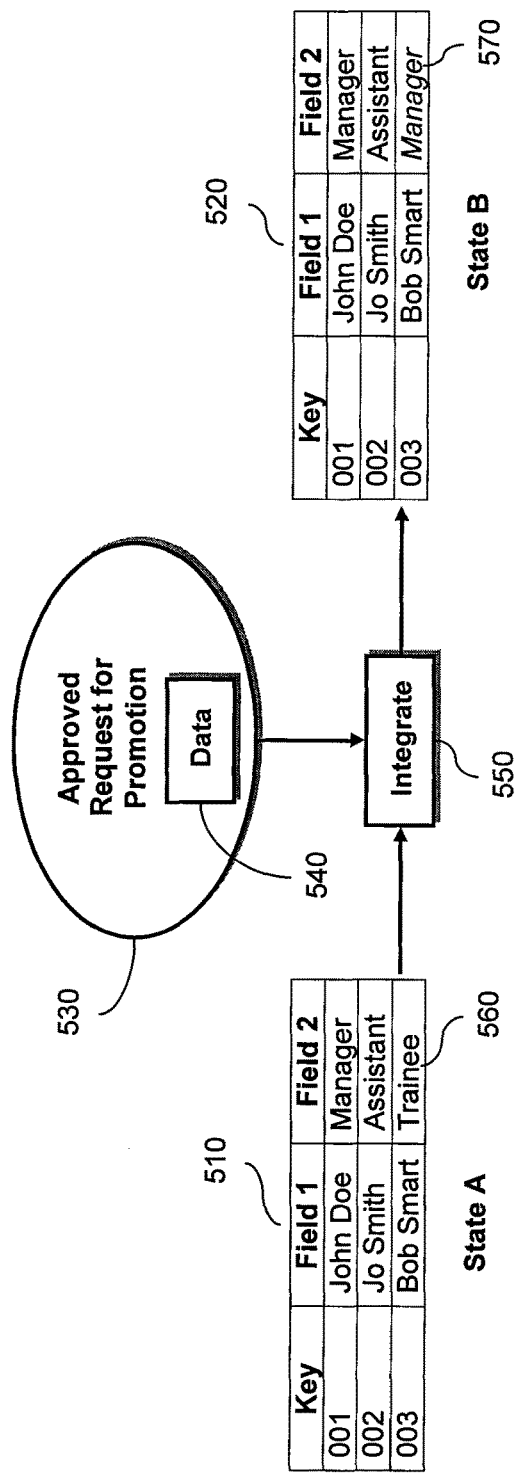
FIG. 5 illustrates an exemplary data integration event following an approved request.

FIG. 5 schematically illustrates a change in a table 510 that forms part of database 140. Before an approval process the table 510 has state A, wherein employee "Bob Smart", as identified in Field 1, has the status of "Trainee", as identified by data item 560 in Field 2. In the example of FIG. 5, a request that employee "Bob Smart" be promoted from "Trainee" to "Manager" has been made and approved. This is illustrated schematically by approved request 530 that has associated data 540. The associated data enables the table 510 to be updated to reflect the change in the job status of employee "Bob Smart". The approved request 530 and data 540 are provided as input to an integration operation 550 that integrates or merges data 540 into table 510 to produce updated table 520 that has state B. In state B, table 520 identifies employee "Bob Smart" as "Manager" through data item 570. Hence, in this simple example, the integration operation changes data item 560 to data item 570.

Returning to FIG. 3, two or more of data handling classes 340 are able to produce the same change in the database 140 from state A to state B as illustrated in FIG. 5. Any one of the two or more data handling classes 340 may thus be used to provide integration operation 550. However, each of the two or more data handling classes 340 provide the change from state A to state B using different intermediate means, i.e. implement the integration operation 550 in different ways. The transaction model 310 may provide input equivalent to approved request 530 and data 540.

In another example, the data handling classes 340 may provide the methods required to initially store data to be approved before an approval operation, e.g. after receipt of request 150. In this example, a first data handling class DHC1 (340-1) may comprise computer program code adapted to provide and/or implement middleware representing database records to capture proposed data changes when using an XML cache; and second and third data handling classes DHC2/3 (340-2/3) may respectively comprise computer program code adapted to provide a direct connection to database 140 in order to store the proposed data changes using a shadow table or a status column.

In order to provide flexibility within the data approval system 110, the present invention allows a developer or system administrator to select one of the plurality of data handling modules 340 to provide a high-level data handling function in the approval process. This is achieved using configuration parameters 330.

In a preferred embodiment, configuration parameters 330 comprise variables in a Java hash table and data handling classes 340 comprise a number of Java classes. In other embodiments other forms of look-up table or parameter storage (for example XML files) may be used. In the present embodiment, the transaction model 310, or one of the modules that comprise the transaction model 320, is adapted, in operation, to make reference to a method or procedure name. This method or procedure name is typically indicative of the high level function that needs to be performed and may comprise a string such as "StoreApprovedData". This method name or string is stored in the first column of a row of the Java hash table implementing configuration parameters 330. A second column is then provided in the Java hash table to store a corresponding class name. This class name may be in the form of a string that refers to one of the plurality of data handling classes 340, wherein the string may be used to initiate the methods of the class. When the transaction model 310, or one of the modules 320, makes a reference to the method name or string, a look-up operation using the configuration parameters 330 is initiated. Such a look-up operation searches for an entry in the first column of a row that matches the referenced method name or string and, if a match is found, the corresponding data handling class name stored in the second column of the configuration parameters 330 is retrieved in order to implement the methods of the named data handling class.

For example, the table below shows one row of an exemplary Java hash table:

TABLE 1

| Method Name | Data Handling Class Reference |
| --- | --- |
| StoreApprovedData | Apps.Transaction.RetrieveDataFromXMLCache |

When the method "StoreApprovedData" is called from the transaction model 310 the class reference "Apps.Transaction.RetrieveDataFromXMLCache" can be retrieved from the hash table and implemented. Such a data handling class may be adapted to use an XML cache to handle request data and integration of approved data into database 140.

If a developer or a system administrator wishes to change the data handling method used in the data approval system 110 then they may simply replace the entry in the second column with an alternate class reference. For example the table below shows the case wherein a data handling class adapted to use a status column is used as part of the approval process.

TABLE 2

| Method Name | Data Handling Class Reference |
| --- | --- |
| StoreApprovedData | Apps.Product.SetStatusToApproved |

Alternatively, if the developer and/or system administrator wishes to use a copy of a table from database 140 (i.e. a shadow table) to implement the data handling within the data approval system 110, the configuration parameters 330 may comprise:

TABLE 3

| Method Name | Data Handling Class Reference |
| --- | --- |
| StoreApprovedData | Apps.Product.MoveDataToLiveTable |

The use of configuration parameters 330 enables different software products implementing different approval processes to use different storage policies. To use a different storage policy all a developer or system administrator need do is change the entry in the configuration parameters 330 for a particular storage policy, e.g. the entry in the second column of a Java hash table for a particular method name. As each of the plurality of data handling modules or classes are adapted to produce a common change in state in a database following approval, improved and/or alternate ways of handling data, such as merging newly improved data into "live" data forming part of a database can be implemented quickly and easily in a "plug-and-play" fashion, i.e. without having to modify or "recode" the program code comprising the transaction model 310 or modules 320. The methods of the transaction model 310 may provide the generic functionality applicable to all approval processes and the selected data handling class or module may provide one of a number of different data handling policies. This also enables developers requiring data handling methods that move beyond the default option provided in a standard data approval system to quickly and easily substitute more efficient data handling methods, i.e. data handling methods that are better suited to the particular circumstances surrounding a chosen approval process than those provided by default.

Figure 4:
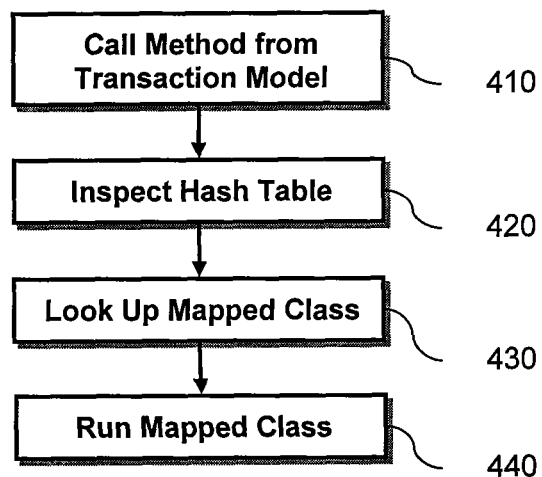
FIG. 4 shows a method of operating the data approval system shown in FIG. 3.

FIG. 4 shows the steps involved in implementing the data approval system of FIG. 3. At step 410 a method is called (e.g. a reference is made to a string identifying a required method) from the transaction model (or one of the modules comprising the transaction model). At step 420, the configuration parameters 330 are inspected, for example by inspecting a Java hash table, and at step 430 the method name or reference called from the transaction model is used to look-up a reference to the mapped data handling class 340 used to implement the data handling functionality. At step 440 this mapped class may then be implemented by loading program code representing the class into working memory before processing said program code using a processor.

The method of the present invention thus enables processes that deviate from a default approval process to be accommodated while remaining close to a standard or common approval process and system that can be used across multiple applications or approval processes.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

What is claimed is:

1. A data approval system comprising:
   a server system communicatively coupled to a database and to a network interface to facilitate access to a network, the server system comprising:
      a transaction model comprising program code for implementing an approval process comprising an approval operation to update data in the database responsive to a request received by the server system via the network interface from a client device;
      a plurality of data-handling modules to provide different methods for managing data during the approval process, wherein each module comprises program code for the server system to implement one or more methods, the plurality of data-handling modules comprising:
         at least one first data-handling module to execute a first method to process the request by implementing a first update in the database to a first state, wherein the first method implements the first update via direct changes to the database and wherein the at least one first data-handling module is programmed to execute the first method by executing the steps of:
            handling data to be approved before the approval operation by storing a proposed data change in a status column of the database;
            in response to receiving an approval to implement the first update from the approval operation:
               handling approved data after the approval operation; and
               integrating the approved data from the status column into the database after the approval operation; and
            in response to receiving a denial to implement the first update from the approval, handling unapproved data after the approval operation by rolling back the proposed data change in the status column of the database; and
         at least one second data-handling module to execute a second method to process the request via implementing a second update in the database to a second state that is different from the first method, wherein the second method implements the second update via the use of a cache that is independent from the database, the first update being equivalent to the second update and the first state being equivalent to the second state such that the first method and the second method each result in a same final alteration to the database, and wherein the at least one second data-handling module is programmed to execute the second method by executing the steps of:
            handling data to be approved before the approval operation by storing the proposed data change in the cache;
            in response to receiving an approval to implement the second update from the approval operation:
               handling approved data after the approval operation; and
               integrating the approved data from the cache into the database after the approval; and
            in response to receiving a denial to implement the second update from the approval operation, handling unapproved data after the approval operation by deleting the proposed data change in the cache; and
      a non-transitory, computer-readable medium storing a configuration file that identifies which of the plurality of data handling modules is used to update the database according to the approval process;
      wherein the server system is programmed to select and execute one or more data-handling modules from the plurality of modules to manage data during the approval process based on the configuration file.

2. The data approval system of claim 1, wherein the configuration file comprises a configuration parameter table with at least two columns:
   a first column storing a name of a particular method used by the transaction model; and
   a second column storing reference data relating to a data-handling module that uses the particular method;
   each row in the table representing a different method that is used by the transaction model, the reference data for each row being configurable for a particular approval process.

3. The data approval system of claim 2, wherein the transaction model is used for a plurality of approval processes, each approval process having an associated configuration parameter table.

4. The data approval system of claim 1, wherein the plurality of data-handling modules comprise a plurality of Java classes.

5. The data approval system of claim 1, wherein the approval process comprises a process for approving at least one of:
   a pay raise;
   an employee promotion;
   a car rental request;
   admission into an academic institution; or
   loan of a media item.

6. The data approval system of claim 1, wherein the server system is programmed to present the approval request to an approver by at least one of:
   sending an email to the approver that contains a link to the data to be approved;
   sending an email to the approver that contains the data to be approved; or
   sending a text message that contains the data to be approved.

7. A method of managing data in an approval process, the method comprising:
   storing, in a non-transitory computer-readable memory, a plurality of data-handling modules to provide different methods for managing data during the approval process, wherein each module comprises program code for the server system to implement one or more methods, the plurality of data-handling modules comprising:

at least one first data-handling module to execute a first method to process an approval request by implementing a first update in the database to a first state, wherein the first method implements the first update via direct changes to the database and wherein the at least one first data-handling module is programmed to execute the first method by executing the steps of:
  handling data to be approved before the approval operation by storing a proposed data change in a status column of the database;
  in response to receiving an approval to implement the first update from the approval operation:
    handling approved data after the approval operation; and
    integrating the approved data into the database after the approval operation; and
  in response to receiving a denial to implement the first update from the approval, handling unapproved data after the approval operation by rolling back the proposed data change in the status column of the database; and
at least one second data-handling module to execute a second method to process the approval request via implementing a second update in the database to a second state that is different from the first method, wherein the second method implements the second update via the use of a cache that is independent from the database, the first update being equivalent to the second update and the first state being equivalent to the second state such that the first method and the second method each result in a same final alteration to the database, and wherein the at least one second data-handling module is programmed to execute the second method by executing the steps of:
  handling data to be approved before the approval operation by storing the proposed data change in the cache;
  in response to receiving an approval to implement the second update from the approval operation:
    handling approved data after the approval operation; and
    integrating the approved data from the cache into the database after the approval; and
  in response to receiving a denial to implement the second update from the approval operation, handling unapproved data after the approval operation by deleting the proposed data change in the cache; and
a configuration file that identifies which of the plurality of data handling modules is used to update the database according to the approval process;

receiving, by a server system communicatively coupled to a network interface to facilitate access to a network, an approval request, via the network from a client device, to update data in a database communicatively coupled to the server system, the approval request indicating an approval process type and a requested proposed data change to the database;
  based at least on the approval process type and the configuration file, identifying, by the server system, one of the at least one first data-handling module or the at least one second data-handling module to implement the approval process type; and
  executing, by the server system, the identified at least one first data-handling module or at least one second data-handling module to process the approval request.

8. The method of claim 7, wherein the plurality of data handling modules further comprise a plurality of Java classes and identifying one of the at least one first data-handling module or the at least one second data-handling module is further implemented using a Java hash table.

9. The method of claim 7, wherein the first approval process type comprises approving one of:
  a pay raise;
  an employee promotion;
  a car rental request;
  admission into an academic institution; or
  loan of a media item.

10. The method of claim 7, further comprising presenting the approval request to an approver by at least one of:
  sending an email to the approver that contains a link to the data to be approved;
  sending an email to the approver that contains the data to be approved; or
  sending a text message that contains the data to be approved.

11. The method of claim 7, wherein storing the configuration file further comprises storing a configuration file comprising at least two columns;
  wherein a reference to a method used during a data approval process is stored in a first column, and a reference to one of a plurality of data-handling modules is stored in a second column;
  wherein each row in the data table represents a mapping for a particular method that is used during the data approval process, and the reference to one of a plurality of data-handling modules for each row is configurable for the particular approval process.

* * * * *